United States Patent [19]

Szpak et al.

[11] Patent Number: 5,680,834
[45] Date of Patent: Oct. 28, 1997

[54] JUST-IN-TIME SCHEDULING FOR VARIABLE CAMSHAFT TIMING

[75] Inventors: Peter Stephen Szpak, Canton; Larry Allen Hardy, Riverview; Daniel Lawrence Meyer, Dearborn, all of Mich.

[73] Assignee: Ford Global Technologies, Inc., Dearborn, Mich.

[21] Appl. No.: 589,361

[22] Filed: Jan. 22, 1996

[51] Int. Cl.⁶ ........................................ F01L 1/34
[52] U.S. Cl. ........................ 123/90.15; 123/90.17; 123/90.31
[58] Field of Search ............... 123/90.15, 90.17, 123/90.31; 74/568 R; 464/1, 2, 160

[56] References Cited

U.S. PATENT DOCUMENTS

| | | | |
|---|---|---|---|
| 4,995,351 | 2/1991 | Ohkubo et al. | 123/90.15 |
| 5,289,805 | 3/1994 | Quinn, Jr. et al. | 123/90.15 |
| 5,363,817 | 11/1994 | Ikeda et al. | 123/90.15 |
| 5,400,747 | 3/1995 | Tabata et al. | 123/90.17 |
| 5,417,187 | 5/1995 | Meyer et al. | 123/90.15 |
| 5,469,818 | 11/1995 | Yoshioka et al. | 123/90.15 |
| 5,522,352 | 6/1996 | Adachi et al. | 123/90.15 |
| 5,562,071 | 10/1996 | Urushihata et al. | 123/90.15 |

*Primary Examiner*—Weilun Lo
*Attorney, Agent, or Firm*—Allan J. Lippa; Roger L. May

[57] ABSTRACT

A system for the just-in time scheduling of camshaft timing for an internal combustion engine. A slave circuit generates an execution period corresponding to the execution period of the variable camshaft timing mechanisms. The control processor initiates the calculation of a correction signal base on the difference between the desired camshaft timing and the actual camshaft timing synchronous with the execution period of the variable camshaft timing mechanism. The calculation of the correction signal is executed by the central processing unit once and only once for each execution period of the variable camshaft timing mechanism.

18 Claims, 2 Drawing Sheets

JUST-IN-TIME SCHEDULING FOR VARIABLE CAMSHAFT TIMING

TECHNICAL FIELD

The invention is a control for scheduling camshaft timing and, in particular, a control for just-in-time scheduling of variable camshaft timing for an internal combustion engine.

BACKGROUND ART

Automotive and other process control applications often require synchronizing uniform time-slice microprocessor calculations with other synchronous, process dependent events as they occur in real-time. Because the timing schemes of synchronizing uniform time-slice microprocessor calculations and asynchronous process dependent events are different, a synchronization technique must be applied. This synchronization technique is usually implemented through the use of microprocessor interrupts.

The typical microprocessor controller consists of a Central Processing Unit (CPU) which sequentially executes program instructions using an integral time-based clock. The order in which the instructions are executed is based upon the sequence of instructions and branching logic. A central processing unit with interrupting architecture stops its current program when a specified event of interest occurs. The central processing unit uses its memory resources to save the register status and vectors of the program being executed and branches to the appropriate interrupt handling program subroutine. Once the interrupt handling program subroutine is completed, the register status of the central processing unit is restored to the state prior to the interrupt. As a result, significant resources of the central processing unit are required to respond to each individual interrupting event.

In the case of automotive applications, the frequency of occurrence of interrupting events may be highly dynamic and exhibit a wide range of variability. As a result, the central processing unit is required to have sufficient memory and execution resources to respond at the highest engine operating speeds. The additional overload of the central processing unit to accommodate sophisticated interrupt structure increases the cost without necessarily improving control system performance.

A novel approach to solving the problem outlined above is to use a just-in-time scheduling in which a set point command is scheduled at the latest possible moment using the most recent input information.

DISCLOSURE OF THE INVENTION

An object of the invention is the just-in-time scheduling of camshaft timing of an internal combustion engine.

Another object of the invention is to calculate the duty cycle for a camshaft timing mechanism at a fixed rate synchronous with the execution period of the camshaft timing mechanism and asynchronous to the engine speed.

Another object is to calculate the duty cycle only once during each execution period of the camshaft timing mechanism to both minimize the interrupts of the program being executed by the central processing unit and to guarantee the derivative portion of the well known proportional-integral-derivative control equation is not inadvertently zeroed.

Another object of the invention is a variable camshaft timing system for an internal combustion engine having a central processing unit responsive to the operational parameters of the engine to generate a desired camshaft timing signal. An actual camshaft timing signal is generated by appropriate sensors. A variable camshaft timing mechanism is responsive to a correction signal to reduce the difference between the desired timing and the actual timing of the camshaft to zero. The central processing unit is responsive to the difference between the desired camshaft timing signal and the actual camshaft timing signal to generate the correction signal. A slave circuit repetitively generates execution periods and transfers the correction signal from the central processing unit to the variable camshaft timing mechanism once during each execution period. The calculation of the correction signal is initiated by the central processing unit in response to the passing of a predetermined portion of the execution period and is executed only once during each execution period of the variable camshaft timing mechanism independent of engine speed.

In the preferred embodiment, the correction signal is calculated as late as possible during the preceding execution period so that the most recent data can be used.

These and other objects of the invention will become more apparent from a reading of the detailed description of the invention in conjunction with the drawings.

BEST MODE FOR CARRYING OUT THE INVENTION

Figure 1:
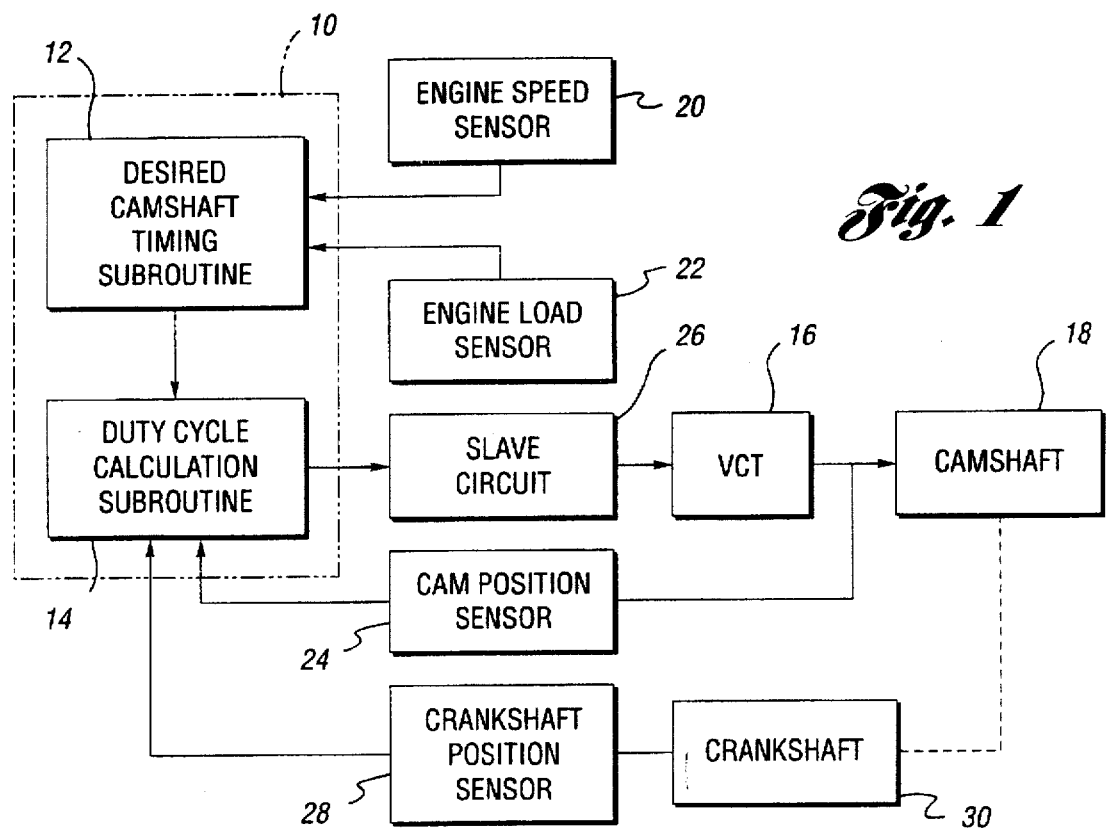
FIG. 1 is a block diagram of the system for scheduling the camshaft timing.

FIG. 1 is a block diagram showing a structure for enabling just-in-time scheduling for variable camshaft timing (VCT). In this structure, the central processing unit 10 has a desired camshaft timing subroutine, indicated by block 12 for computing a desired timing of the camshaft relative to the crankshaft of the engine, and a duty cycle calculation subroutine, indicated by block 14, for computing a correction signal activating a variable camshaft timing mechanism 16 to correct the timing of the camshaft 18 to the desired timing relationship with the crankshaft 30. The position of the crankshaft 30 is determined by a crankshaft position sensor 32 such as a variable reluctance sensor detecting the toothed wheel attached to the crankshaft.

The central processing unit 10 will generate the desired timing of the camshaft 18 in response to sensors measuring predetermined operational parameters of the engine, such as an engine speed sensor 20 and an engine load sensor 22. The desired position of the camshaft 18 relative to the crankshaft 30 of the engine is compared by the duty cycle calculation subroutine 14 with the actual position of the camshaft 18 measured by a camshaft position sensor 24 to generate a timing error signal.

Knowing the difference between the desired timing of the camshaft 18 relative to the crankshaft, the duty cycle subroutine 14 of the central processing unit 10 will calculate a correction signal enabling the variable camshaft timing mechanism 16 to change the timing relationship between the camshaft 18 and the crankshaft 30 to be substantially equal to the desired timing.

In the preferred embodiment, the variable camshaft timing mechanism 16 is a pulse width modulated solenoid valve. The desired camshaft timing is obtained by modulating the duty cycle (on verses off time) of the pulse width modulated solenoid to control the timing of the camshaft. The cause-effect relationship between the input and output of the duty cycle calculation subroutine 14 is modeled using the well known proportional-integral-derivative (PID) control equation as follows:

$$\text{Duty Cycle} = P \cdot E + I \cdot \int_0^t E\,dt + D \cdot \frac{dE}{dt} + \text{offset} \quad (1)$$

where:
P=proportional gain
I=integral gain
D=derivative gain
E=error in camshaft timing (desired-actual)
t=time
offset=a feed forward duty cycle term.

For discrete linear systems, the integral term $I \cdot \int_0^t E\,dt$ is approximated as:

$$I \cdot \int_0^t E\,dt = I \cdot \sum_1^n E_n \cdot (t_n - t_{n-1}) \quad (2)$$

The derivative term D·dE/dt is approximated as:

$$D \cdot \frac{dE}{dt} = D \cdot \frac{E_n - E_{n-1}}{t_n - t_{n-1}} \quad (3)$$

where the subscript n denotes the nth measurement. During closed loop operation, each term of the PID control equation contributes to the duty cycle and will reduce the error in camshaft timing toward zero. The first term, P.E., in Equation (1) produces a control duty cycle linearly proportional to the error in the camshaft timing and is referred to as proportional feedback. Proportional feedback increases the speed of driving the timing error toward zero and is often a major contributor to the value of the duty cycle.

The integral term, $I \int_0^t E\,dt$ of Equation (1) produces a control duty cycle based on past errors and is referred to as integral feedback. Integral feedback is used to reduce or eliminate steady state (drifting) errors. The derivative term D·dE/dt produces a control duty cycle based on rate of change of the timing error E and is referred to as derivative feedback. Derivative feedback is typically used in conjunction with the proportional and/or integral feedback to increase the system damping and improve the general stability of the system. The sum of the proportional, integral, and derivative terms is referred to as the PID feedback.

Individual terms of Equation (1) will dominate the value of the resultant duty cycle depending on the magnitude of the timing error E. In principal (without an offset term), once the desired camshaft timing is achieved, the timing error E will be reduced to zero and the integral term will produce a duty cycle signal having a value equal to the duty cycle required to maintain the desired camshaft timing. The value of the integral term is often referred to as the null duty cycle.

The null duty cycle is rarely constant, and often changes rapidly during transient operation of the engine. The integral term will compensate for such changes. However, this process requires a finite amount of time, during which large system errors can exist. A feed forward offset is preferably implemented to compensate for a null duty cycle shift when the cause and effect relationship between the null duty cycle and the variable is known. This approach reduces or eliminates errors during transient. In the preferred embodiment, the feed forward offset is a function of the engine oil pressure.

Appropriate proportional gain (P), integral gain (I) and derivative gain (D) are selected to obtain optimal system performance.

Figure 2:
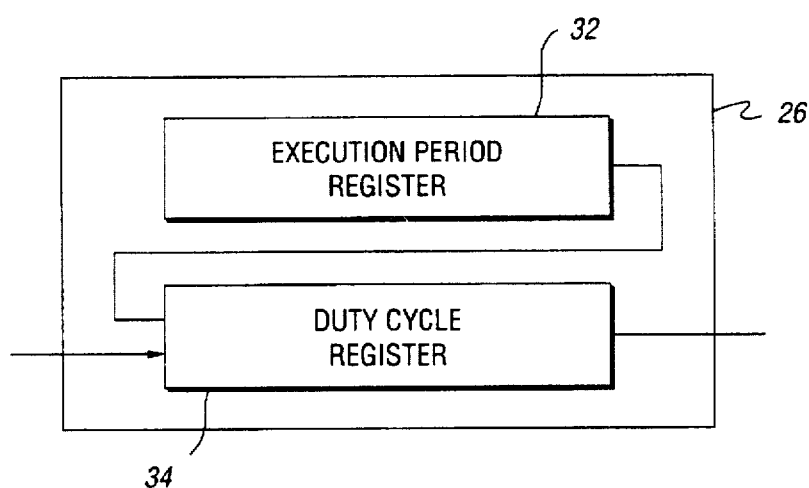
FIG. 2 is a block diagram showing the relevant content of the slave circuit.
Figure 3:
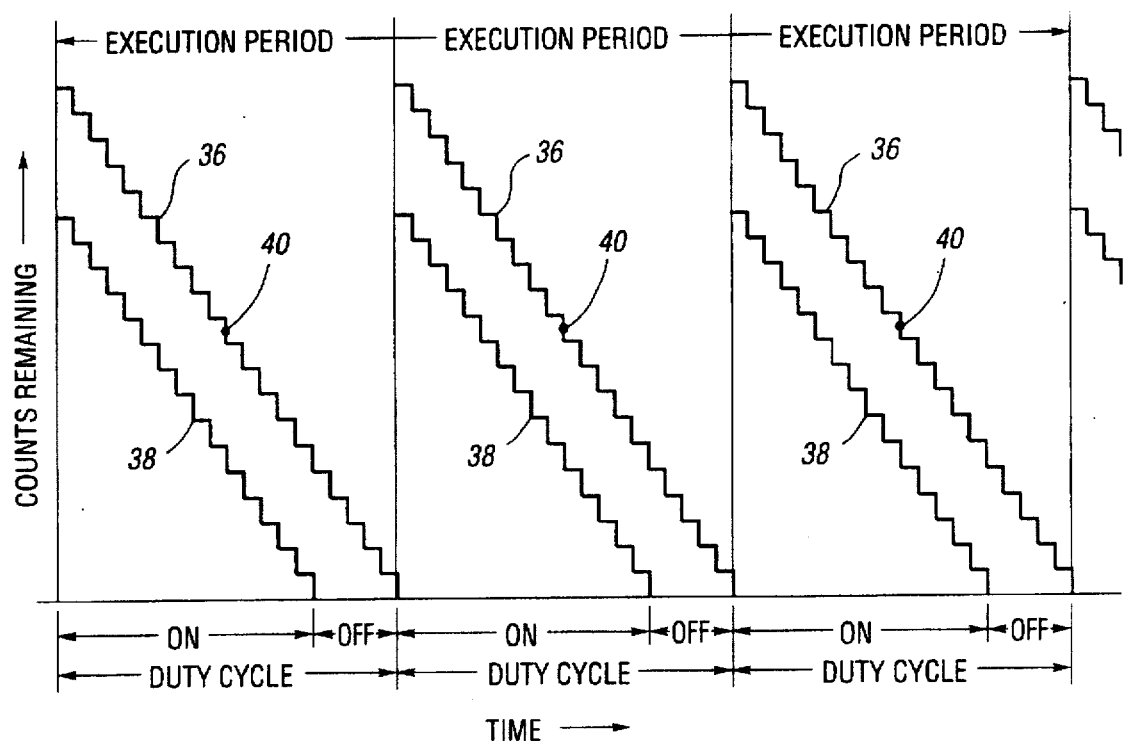
FIG. 3 is a graph showing the decrementing of the execution period and duty cycle registers.

The execution of the control duty cycle is performed by a slave circuit 26 operating at a fixed frequency. The slave circuit 26 as shown in FIG. 2 has two registers. The first or execution period register 32 controls the duration of the execution period of the duty cycle. The second or duty cycle register 34 controls the duty cycle of the variable camshaft timing mechanism 16. As shown in FIG. 3, the execution period register 32 is basically a counter which starts at a preselected value (number) and is counted down to zero as indicated by stepped waveform 36 to define an execution period of the variable camshaft timing mechanism 16. The execution period register 32 is repetitively reloaded with the preselective number at the end of each execution period, i.e. each time the execution period register 32 is counted down to zero.

The execution period is determined by the recommended driving frequency of the mechanism being driven and, in particular, the variable camshaft timing mechanism 16. In the preferred embodiment, the execution period of a known type of camshaft timing mechanism is approximated 20 milliseconds.

The duty cycle register 34 is also a counter which is loaded with the value related to the desired duty cycle calculated by the duty cycle calculation subroutine 14 prior to the beginning of each execution period. The counting down of the duty cycle register 34 indicated by stepped waveform 38 in FIG. 3 is initiated simultaneously with the counting down of the execution period register 32. The duty cycle signal output from the slave circuit 26 is a signal of a first polarity as long as the duty cycle register is being counted down and switches to a second polarity upon the duty cycle register being counted down to zero.

The frequency at which the duty cycle register 34 is being counted down may be at the same frequency at which the execution period register 32 is counted down. However, for higher resolution of camshaft timing, the duty cycle register may be counted down at a much higher frequency.

The frequency at which execution period register 28 and duty cycle register 30 are counted down are preferably derived from an internal clock but may be counted down using clock pulse obtained from the clock controlling the central processing unit 10.

The central processing unit 10 periodically interrogates the state of the execution period register 32 and initiates the calculation of the duty cycle by executing the desired camshaft timing and duty cycle calculation subroutines 12 and 14, respectively, once during each execution period. The desired camshaft timing and duty cycle calculation subroutines are executed in response to the execution period register being decremented to a predetermined number. Preferably, the desired camshaft timing subroutine and duty cycle calculation subroutines are executed as late as possible in the preceding execution period so that the data used in calculating the desired time shaft timing and the duty cycle is the most current data available.

As shown in FIG. 3, the desired camshaft timing and duty cycle calculations are preferably initiated at a predetermined point during each execution period such as point 40 in FIG. 3. After each execution period, the execution period register 32 and the duty cycle register 34 are loaded with a number of counts equal to the execution period and the value of the duty cycle respectively. As a result, the calculation of the desired camshaft timing by the desired camshaft time subroutine 12 and the duty cycle calculation subroutine 14 occurs once and only once during each execution period.

Figure 4:
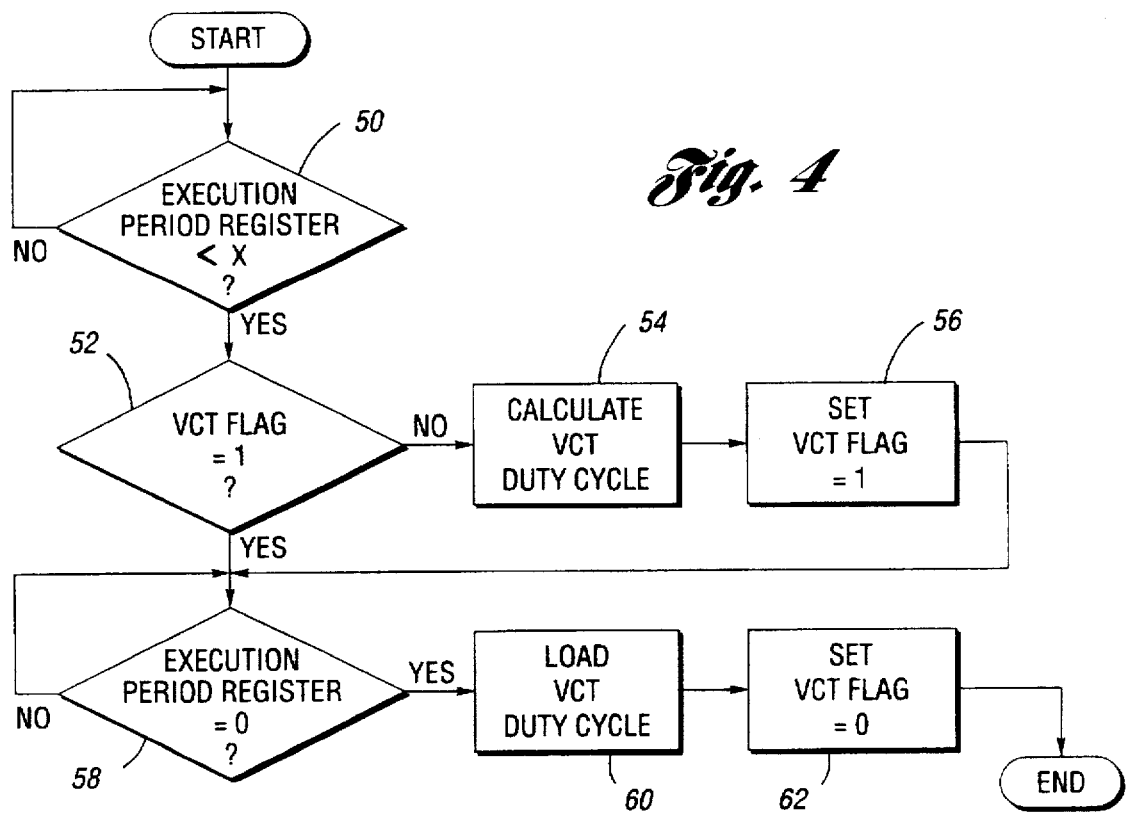
FIG. 4 is a flow diagram of the operation of the system.

FIG. 4 is a flow diagram of the operation of the scheduling for variable crankshaft timing according to the invention. The procedure starts by inquiring, decision block 50, if it is time to calculate the duty cycle for the next execution period, i.e. has the execution period register 28 been decremented to less than the value x indicated by point 40 in FIG. 3. If not, the process will wait until the execution period register 32 is decremented to a value equal to or less than the value x. Once the execution period register is decremented to a value ≤x, the subroutine will then inquire, at decision block 52, if a duty cycle has been generated for the next execution period. This is indicated by a VCT flag set to 1 after the duty cycle is calculated for the first time for the next execution period.

If a duty cycle has not been calculated, duty cycle subroutine 14 will calculate a new duty cycle block 54 and set the VCT flag to 1. As indicated by block 56, the process will then wait until the execution period register times out block 58, i.e. execution period register=0, then proceed to load the duty cycle in the duty cycle register 30 at block 60 and reset the VCT flag to 0, block 62, and then end. The central processing unit 10 will then periodically inquire to determine if the execution period register 32 has been decremented to a value ≤x, as previously described.

While the best mode for carrying out the invention has been described in detail, those familiar with the art to which this invention relates will recognize various alternative designs and embodiments for practicing the invention as defined by the following claims.

What is claimed is:

1. A system for just-in-time scheduling of camshaft timing of an internal combustion engine, comprising:

first means responsive to operational parameters of the engine for generating a desired camshaft timing with respect to the crankshaft of the engine;

second means responsive to an actual timing between the camshaft and the crankshaft of the engine for generating an actual camshaft timing signal;

a variable camshaft timing mechanism for varying the timing of the camshaft relative to the crankshaft of the engine in response to a correction signal, said variable camshaft mechanism having a predetermined execution period;

third means responsive to the difference between said desired camshaft timing and said actual camshaft timing for generating said correction signal correcting said actual camshaft timing toward said desired camshaft timing; and a slave circuit for actuating said third means to generate said correction signal only once during each execution period of said camshaft timing mechanism and for conveying said correction signal to said variable camshaft timing mechanism to correct the actual camshaft timing to be equal to said desired camshaft timing.

2. The system of claim 1 wherein said first, second and third means are subroutines executed by a central unit processor.

3. The system of claim 1 wherein said engine includes a central processing unit, said first, second and third means are subroutines embodied in said central processing unit.

4. The system of claim 3 wherein said variable camshaft mechanism is a pulse width modulated solenoid valve having said predetermined execution period and wherein said slave circuit converts said correction signal to a duty cycle signal, executed by said camshaft timing mechanism once during each execution period.

5. The system of claim 4 wherein said slave circuit comprises:

an execution period register;

means for loading said execution register with a predetermined value at the beginning of each execution period;

a duty cycle register;

means for loading said duty cycle register with a value corresponding to correction signal at the beginning of each execution period; and means for repetitively decrementing said execution period register to zero to determine the duration of said execution period and decrementing said pulse width register to zero to generate a duty cycle signal during each execution period, said duty cycle signal activating said pulse width modulated solenoid valve to change said camshaft timing towards said desired camshaft timing.

6. The system of claim 5 wherein said central processing unit periodically interrogates the status of the execution period register to active said third means to generate said correction signal in response to said execution period register being decremented to a predetermined value.

7. The system of claim 6 wherein said predetermined value is selected so that said correction signal will be generated as late as possible in the preceding execution period so that said correction signal will be generated using the most current data.

8. The system of claim 7 wherein said first, second and third means are subroutines of a program executed by the central processing unit in response to an interrupt generated when said executed period register is decremented to a value equal to or less than said predetermined value.

9. A method for just-in-time scheduling of the camshaft timing of an internal combustion engine comprising:

repetitively generating an execution period corresponding to the execution period of a variable camshaft timing mechanism;

detecting at least one operational parameter of the engine in response to the expiration of a predetermined portion of said execution period to generate a desired timing signal;

detecting a current camshaft timing of the engine to generate an actual crankshaft timing signal in response to said expiration of said predetermined portion of said execution period;

generating a correction signal in response to the difference between said desired and actual timing signals; and activating said variable camshaft timing mechanism with said correction signal, only once during the next execution period to change the actual camshaft timing to be equal to said desired camshaft timing.

10. The method of claim 9 wherein said step of generating a correction signal comprises the step of solving a proportional-integral-derivative equation.

11. The method of claim 9 wherein said step of generating a correction comprises the step of solving the following equation:

$$\text{Duty Cycle} = P \cdot E + 1 \int_0^t E dt + D \cdot \frac{dE}{dt} + \text{offset}$$

where
P=proportional gain

I=integral gain
D=derivative gain
E=error in camshaft timing (desired-actual)
t=time
offset=a feed forward duty cycle term.

12. The method of claim 9 wherein said step of repetitively generating an execution period comprises;
   detecting the decrementing of an execution period register to zero to load a predetermined value into said execution period register; and
   decrementing at predetermined intervals said execution period register to zero, the time required to decrement said execution period register to zero defining the duration of each execution period.

13. The method of claim 12 wherein said predetermined portion of said execution period is the time required to decrement said execution register to a predetermined value.

14. The method of claim 13 wherein said predetermined value is selected so that said correction signal is generated as late as possible during said execution period so that the correction signal to be used during the next execution period will be generated using the most current data.

15. The method of claim 12 wherein said step of detecting to generate a desired camshaft timing signal and said step of generating a correction signal are executed by a central processing unit.

16. The method of claim 15 wherein said central processing unit repetitively interrogates said execution period register to initiate the generation of said desired timing signal and said correction signal when said execution period register is decremented to a value equal to or less than said predetermined value.

17. The method of claim 9 wherein said step of activating said variable camshaft timing mechanism comprises the steps of:
   loading a duty cycle register with said correction signal at the beginning of each execution period; and
   decrementing said duty cycle register to zero during said execution period to generate a duty cycle signal having a first value prior to said duty cycle register being decremented to zero and a second value after said duty cycle register is decremented to zero during each execution period.

18. The method of claim 17 wherein said variable timing mechanism includes a pulse modulated solenoid, said step of activating said variable camshaft timing mechanism comprises the step of activating said pulse modulated solenoid with said duty cycle signal once during each execution period.

* * * * *